United States Patent

[11] 3,589,425

| | | |
|---|---|---|
| [72] | Inventor | Jean Francis Olagnier<br>Ermont, France |
| [21] | Appl. No. | 803,251 |
| [22] | Filed | Feb. 28, 1969 |
| [45] | Patented | June 29, 1971 |
| [73] | Assignee | Penumatiques Caoutchouc Manufacture Et Plastiques Kleber-Colombes<br>Colombes, France |
| [32] | Priority | Mar. 1, 1968 |
| [33] | | France |
| [31] | | 142160 |

[54] HEAVY DUTY TIRES
3 Claims, 1 Drawing Fig.

| | | |
|---|---|---|
| [52] | U.S. Cl. | 152/361 |
| [51] | Int. Cl. | B60c 9/16 |
| [50] | Field of Search | 152/361, 289 |

[56] References Cited
UNITED STATES PATENTS

| | | | |
|---|---|---|---|
| 2,930,426 | 3/1960 | Klang et al. | 152/361 |

*Primary Examiner*—James B. Marbert
*Attorney*—Holcombe, Wetherill & Brisebois

ABSTRACT: This invention relates to heavy duty tires, for example, for airplanes. According to the invention, there are located within the tread two superimposed reinforcing layers of metal cables that are oriented obliquely, with one layer crossing the other. The assembly of these two layers forms a protective means located immediately below the area of the tread pattern and being separated from the tire casing by a layer of rubbery material of substantially constant thickness that is free from filamentary reinforcement.

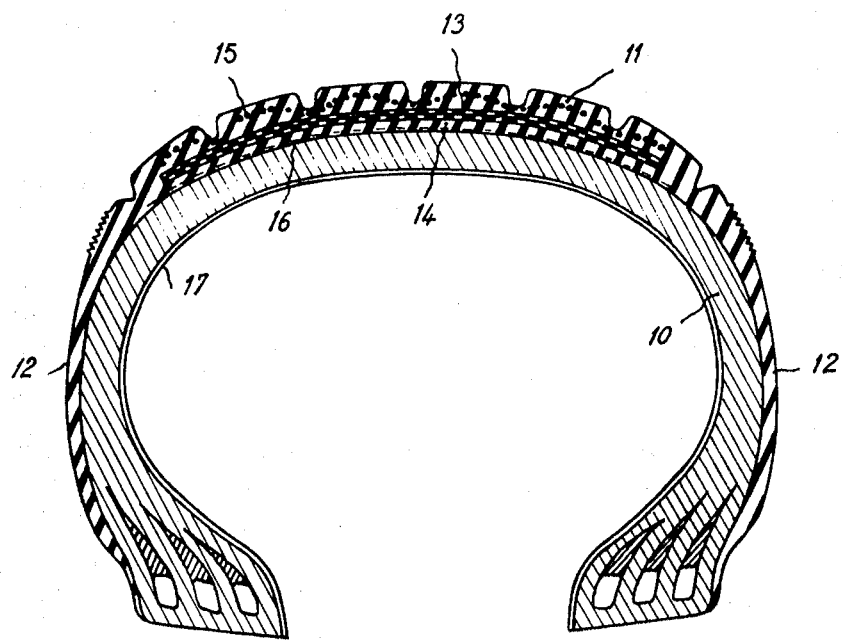

HEAVY DUTY TIRES

The present invention relates to tires for fitting to heavy and fast vehicles such as airplanes which take off and land at high speeds. It relates, more particularly to tires of the type having reinforcing elements located within the tread and consequently distinct from any elements forming the actual carcass, and being primarily intended to increase the resistance to distortions of the tread and to avoid it being stripped off at high speeds.

Because tires of this kind are inflated to high pressures in order to support the heavy loads, they are quite sensitive to cuts when they are used on runways in bad conditions. In order to increase their resistance to cuts, it has already been proposed to incorporate in the tread, in addition to the reinforcing elements or in place of one of them, a protective layer formed of a mixture of rubber containing sections of entangled metal filaments. This layer offers a certain resistance to puncturing and helps to prevent growing of cuts on the tread but it has still not the desired efficiency. It has also been observed that under the influence of repeated deflection of the tire in use, the metal filaments of the protective layer have a tendency to penetrate towards the interior of the tire and to pierce the airtight interior layer or the inner tube of the tire which thus gradually loses its airtightness.

It is a primary object of the invention to remove or minimize these drawbacks and to produce consequently a tire of the type mentioned, which will be resistant to cuts and which will also retain its other properties.

According to the invention the tire comprises within its tread two superimposed reinforcing layers of metal cables orientated obliquely, one layer crossing over the other, the assembly comprising said two layers forming a protective means and being located immediately below the area of the tread pattern and being separated from the carcass by a layer of rubbery material of substantially constant thickness free from filamentary reinforcement. The assembly of these two superimposed layers comprises both a protective means preventing a cut from growing in size and reaching the casing, and a reinforcement which increases the resistance of the the tread to centrifugal stresses tending to strip off the casing, similarly to textile reinforcers incorporated in the tread of tires of this kind. Moreover, the layer of rubber placed between the protective means and the casing preserves sufficient suppleness of the tread, while the absence of metal filaments ensures that no puncture of the inner tube or the inner airtight layer can occur from this reason.

The layers forming the protective means are made of metal cables having a large elastic elongation of at least 15 percent calendered with a rubbery mixture having a high modulus of elasticity of at least 100 kg./cm.$^2$ with an elongation of 200 percent.

In order that the invention may be more clearly understood, reference will now be made to a specific embodiment thereof described by way of example with reference to the accompanying drawing which shows a cross-sectional view of this tire.

Referring to the drawing, there is therein shown a tire which comprises a carcass 10 formed from a certain number of superimposed layers of cord fabric (material without weft or with a light weft, formed of parallel cords embedded in a thin layer of rubber) the number of the layers being dependent upon the size of the tire and of the required strength. The carcass is provided externally with a tread 11 and sidewalls 12. When the tire in question is not to be fitted with an inner tube, the carcass is coated internally with the usual airtight layer 17.

A cut protective assembly 13 comprises two superimposed reinforcing each formed from metal cables orientated obliquely, for example, at 45° with one layer symmetrically crossing the other. The assembly formed in this way is located immediately below the tread pattern and is separated from the carcass 10 by a layer 14 of a tread rubber mixture, free from metal filaments. The protective means 13 extends axially in width up to points adjacent the shoulders and takes the exact shape of the transverse curvature of the top of the carcass 10 so that the layer 14 of the rubbery mixture has a substantially constant thickness. This thickness can vary according to the size of the tire between approximately 2 to 5 mm. It allows a sufficient degree of suppleness of the tread to be preserved in order to absorb shocks from small obstacles and to avoid transmitting corresponding shocks to the carcass. It facilitates, moreover, when retreading the tire, the removal of the worn out assembly of the tread with its protective means 13 and its replacement by a new tread assembly.

In order to produce the protective means 13 shown, it has been found advantageous to use metal cables with a large elastic elongation so as not to introduce any undesirable stiffness and to obtain a tire having the same tread characteristics of elasticity as a tire only having reinforcements of textile cables. In this case, it is preferable to use these metal cables with a large elastic elongation in the form of layers calendered with a rubber of high modulus of elasticity, that is to say, a rubber having a modulus of elasticity of at least 100 kg./cm.$^2$ with 200 percent elongation while the rubber usually used for the calendering of the known breaker layers and for the tread in which the protective means 13 is embedded has a modulus of elasticity not exceeding 75 to 80 kg./cm.$^2$. In fact, in the protective means formed in this way, the rubber of high modulus allows large local distortions by elongation of the metal cables, which permit the protective means 13 better to resist the distortions by dispersing over a larger surface, the penetration force of an object causing a puncture, but on the other hand the strength of the rubber, cooperates advantageously in maintaining the protective means. This thus avoids, to a greater extent, the cables of the protective means becoming permanently distorted which would risk weakening their resistance, particularly with regard to repeated deflections to which these cables are subjected when the tire is running on the ground. This also facilitates, during rolling, the ejection of the puncturing object, stopped by the protective means.

The utilization of a rubber with a high modulus in which are embedded the layers of metal cables of the protective means 13 also permits, according to another characteristic of the present invention, to space the cables apart from one another advantageously on the surface of each layer, in order to form a protective means with a network structure. Such a means is lighter, which is particularly good for airplanes tires as well as for not increasing unnecessarily the static weight of the tires and also to reduce the centrifugal dynamic stresses exerted on the tread of tires rolling at high speed. However, the protective means retains a good resistance to puncturing stresses, since the rubber of modulus, ensures a solid transverse bond between the cables which resists resiliently the penetration of the puncturing body through the protective means.

By metal cables with a large elastic elongation, is to be understood, metal, e.g. steel cables having an elastic elongation higher than 15 percent and which may attain 40 percent. Although, up to now, metal cables have been little used in rubber articles, they are known and they may consist of drawn wires or extruded filaments. By way of indication, metal cables of 1 mm. in diameter have been used made approximately of (1+6×3 wires of 17/100 mm.

These metal cables are arranged in a layer and this is coated on both sides by calendering with a mixture of rubber of appropriate composition so that after vulcanization it will have the desired high modulus of elasticity, the thickness of the calendered layer being of the order of 1 to 1.5 mm. The thickness of the rubber coating formed by the calendering is preferably equal on the two sides of the layer but one can also have layers of different thicknesses. In this latter case, it seems preferable to superimpose the two layers of the protective means so that the thicker rubber coating is towards the radially outer face of the protective means and so that the metal cables of the two superimposed layers are as close together as possible.

In these calendered layers, the distribution of the metal cables can be of any desired density. With cables of 0.8 to 1.2 mm. in diameter, one may have 16 to 25 cables per inch of the width, which corresponds to a "normal" distribution. In the case, where the cables are further apart, there may be 7 to 10 cables per inch of width, in order to obtain the network construction of the protective means 13.

Over and above the protective means 13, the tread can be further reinforced externally by one or more cord reinforcements 15 which, in a manner known per se, are transversely undulated in order to extend into the ribs of the tread 11.

The tire can also comprise a textile or metal protective means 16 located directly on the top of the casing in order to ensure an additional protection therefor.

I claim:

1. A pneumatic tire having a generally toroidal carcass and a patterned rubber tread bonded to said carcass, a cut protective breaker located within said tread immediately below the tread pattern and separated from said carcass by a layer of tread rubber of substantially uniform thickness free from filamentary reinforcement, said breaker consisting of two superimposed reinforcing layers of metal cables having an elastic elongation of at least 15 percent calendered with a rubber mixture having a high modulus of elasticity of at least 100 kg./cm.$^2$ with 200 percent elongation, the cables of each reinforcing layer being orientated obliquely with the cables of one layer symmetrically crossing the cables of the other layer.

2. A tire according to claim 1 wherein at least one reinforcing textile layer is embedded in the patterned tread, said layer having transverse undulations so as to extend into the ribs of the tread.

3. A tire according to claim 1, wherein the metal cables have a diameter of between 0.8 and 1.2 mm. and are transversely spaced with 7 to 10 cables per inch of width.